United States Patent
Avasiloaie (10) Patent No.: US 9,663,071 B2
(45) Date of Patent: May 30, 2017

(54) WIPER ADAPTER AND WIPER ASSEMBLY INCORPORATING SAME

(71) Applicant: TRICO PRODUCTS CORPORATION, Rochester Hills, MI (US)

(72) Inventor: Valentin Avasiloaie, Dearborn Heights, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 14/289,813

(22) Filed: May 29, 2014

(65) Prior Publication Data
US 2015/0343998 A1    Dec. 3, 2015

(51) Int. Cl.
*B60S 1/40*   (2006.01)
*B60S 1/38*   (2006.01)

(52) U.S. Cl.
CPC ........... *B60S 1/4009* (2013.01); *B60S 1/4003* (2013.01); *B60S 1/4016* (2013.01); *B60S 1/381* (2013.01); *B60S 1/387* (2013.01); *B60S 1/3867* (2013.01)

(58) Field of Classification Search
CPC ........ B60S 1/387; B60S 1/3867; B60S 1/386; B60S 1/4003; B60S 1/4045; B60S 1/409; B60S 1/381
USPC .......... 15/250.32, 250.43, 250.361, 250.201, 15/250.44
See application file for complete search history.

(56) References Cited

U.S. PATENT DOCUMENTS

| | | | |
|---|---|---|---|
| 2,589,339 A | 3/1952 | Carson |
| 2,616,112 A | 11/1952 | Smulski |
| 2,643,411 A | 6/1953 | Nesson |
| 2,799,887 A | 7/1957 | Nemic |
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |

(Continued)

FOREIGN PATENT DOCUMENTS

| | | |
|---|---|---|
| DE | 1028896 B | 4/1958 |
| DE | 1247161 B | 8/1967 |

(Continued)

OTHER PUBLICATIONS

International Search Report and Written Opinion of the Searching Authority dated Sep. 3, 2015 issued in PCT Application No. PCT/US2015/032980.

*Primary Examiner* — Michael Jennings
(74) *Attorney, Agent, or Firm* — Miller Canfield (57) ABSTRACT

The present invention relates to an adapter for use in releasably attaching a wiper assembly to a wiper arm hook including a top and a bottom with an aperture. The adapter includes a body, a deck, a release tab, a tooth, and a biasing element. The body has sides to accommodate wiper hook. The deck engages the top of the wiper hook. The release tab is spaced from the deck, is disposed between the sides, and extends to a distal end. The tooth depends from the release tab and engages the aperture of the bottom of the wiper hook. The biasing element depends from the release tab, is disposed between the tooth and the distal end, and engages the bottom of the wiper hook such that the release tab is displaced upwardly toward the top of the wiper hook when the tooth engages the aperture of the wiper hook.

20 Claims, 6 Drawing Sheets

(56) References Cited

U.S. PATENT DOCUMENTS

| | | |
|---|---|---|
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Biachi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 * | 6/2006 | Coughlin ............ B60S 1/4003 15/250.32 |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wllms et al. |
| 7,287,296 B2 | 10/2007 | Vacher |
| 7,451,520 B2 | 11/2008 | Weiler et al. |
| 7,523,522 B2 | 4/2009 | Herring et al. |
| 7,546,660 B2 | 6/2009 | Heinrich et al. |

(56) References Cited

U.S. PATENT DOCUMENTS

| | | |
|---|---|---|
| 7,581,279 B2 | 9/2009 | Baseotto et al. |
| 7,621,016 B2 | 11/2009 | Verelst et al. |
| 7,774,892 B2 | 8/2010 | Coughlin |
| 8,042,218 B2 | 10/2011 | Moll et al. |
| 2002/0026681 A1 | 3/2002 | Nacamuli |
| 2003/0159229 A1 | 8/2003 | Weiler et al. |
| 2004/0019997 A1 | 2/2004 | Baseotto et al. |
| 2004/0025281 A1 | 2/2004 | Baseotto et al. |
| 2004/0123414 A1* | 7/2004 | Lee .................. B60S 1/4003 15/250.32 |
| 2005/0028312 A1* | 2/2005 | Coughlin .......... B60S 1/4003 15/250.32 |
| 2006/0130263 A1 | 6/2006 | Coughlin |
| 2006/0218740 A1* | 10/2006 | Coughlin .......... B60S 1/4038 15/250.32 |
| 2007/0174989 A1 | 8/2007 | Moll et al. |
| 2008/0066254 A1 | 3/2008 | Vacher |
| 2009/0199357 A1 | 8/2009 | Thienard |
| 2010/0212101 A1 | 8/2010 | Thienard et al. |
| 2011/0277264 A1 | 11/2011 | Ehde |
| 2012/0060315 A1* | 3/2012 | Avasiloaie ........... B60S 1/381 15/250.32 |
| 2012/0060316 A1* | 3/2012 | Avasiloaie ........... B60S 1/381 15/250.33 |
| 2013/0152323 A1* | 6/2013 | Chien ................ B60S 1/3849 15/250.32 |
| 2014/0068886 A1* | 3/2014 | Ku ......................... B60S 1/40 15/250.32 |
| 2014/0182075 A1* | 7/2014 | Polocoser .......... B60S 1/3849 15/250.32 |
| 2014/0317874 A1* | 10/2014 | Avasiloaie ......... B60S 1/3867 15/250.32 |

FOREIGN PATENT DOCUMENTS

| | | | |
|---|---|---|---|
| DE | 1505397 A1 | 10/1969 | |
| DE | 1655410 A1 | 8/1971 | |
| DE | 2311293 A1 | 9/1974 | |
| DE | 2336271 A1 | 2/1975 | |
| DE | 2350302 A1 | 4/1975 | |
| DE | 2353368 A1 | 5/1975 | |
| DE | 2640399 A1 | 3/1977 | |
| DE | 19729865 A1 | 1/1999 | |
| DE | 19734843 A1 | 2/1999 | |
| DE | 19814609 A1 | 10/1999 | |
| DE | 10335393 A1 | 9/2004 | |
| DE | 2557002 * | 3/2013 | |
| EP | 0594451 A1 | 4/1994 | |
| EP | 0863058 A2 | 9/1998 | |
| EP | 1346890 B1 | 12/2007 | |
| FR | 1069875 A | 2/1954 | |
| FR | 2377302 A1 | 8/1978 | |
| FR | 2515121 A1 | 4/1983 | |
| GB | 878951 A | 10/1961 | |
| GB | 1012902 A | 12/1965 | |
| GB | 1489791 | 4/1975 | |
| GB | 1395918 A | 5/1975 | |
| GB | 2308542 A | 7/1997 | |
| JP | 3134473 U * | 8/2007 | ............ B60S 1/4003 |
| JP | 2007-331748 A | 12/2007 | |
| KR | 10-2006-0087237 B1 | 8/2006 | |
| WO | 200021809 A1 | 4/2000 | |
| WO | 02087935 A1 | 11/2002 | |
| WO | 03051696 A1 | 6/2003 | |
| WO | 03080409 A1 | 10/2003 | |
| WO | 2004048163 A1 | 6/2004 | |
| WO | 2004076251 A1 | 9/2004 | |
| WO | 2004076252 A1 | 9/2004 | |
| WO | 2005039944 A1 | 5/2005 | |
| WO | 2006069648 A1 | 7/2006 | |
| WO | 2009133979 A1 | 11/2009 | |
| WO | 2011131395 A2 | 10/2011 | |

\* cited by examiner

WIPER ADAPTER AND WIPER ASSEMBLY INCORPORATING SAME

BACKGROUND OF THE INVENTION

1. Field of the Invention

The present invention relates generally to wiper systems, and more specifically, to wiper adapters for wiper assemblies.

2. Description of the Related Art

Conventional automotive wiper systems known in the art include some type of wiper assembly (sometimes referred to as a wiper blade) mounted to a wiper arm which, in turn, is mounted adjacent to a surface to be wiped, such as a windshield of a vehicle, and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. The wiper assembly also typically includes a coupler that attaches to and supports the one or more metal strips, and an adapter attached to the coupler. The adapter allows the wiper assembly to be releasably attached to the wiper arm. In this context, the wiper arm delivers a downward force to the wiper assembly that is distributed thereacross, pressing the wiper assembly into contact with the windshield. The wiper assembly also typically includes an airfoil that attaches to the metal strips, and may also include pair of end caps located at distal ends of the wiper assembly.

Each of the components of a wiper assembly of the type described above must cooperate to effectively clean a surface to be wiped. In addition, each of the components must be designed not only to facilitate an improved wipe quality, but also so as to reduce the cost and complexity of assembling the wiper assembly.

While wiper assemblies known in the related art have generally performed well for their intended purpose, there remains a need in the art for a wiper system that has superior operational characteristics, reduces the cost of manufacturing the assembly, and provides simple releasable attachment to a wiper arm.

SUMMARY OF THE INVENTION

The present invention overcomes the disadvantages in the related art in an adapter for use in releasably attaching a wiper assembly to a wiper arm having a hook including a top part and a bottom part with an aperture disposed in the bottom part. The adapter includes a body, a deck, a resilient release tab, a tooth, and a biasing element. The body has a pair of sides spaced from each other so as to accommodate the hook of the wiper arm therebetween. The deck extends between the sides and engages the top part of the hook of the wiper arm. The resilient release tab is spaced from the deck, is disposed between the sides, and extends to a distal end. The tooth depends from the release tab and engages the aperture of the bottom part of the hook of the wiper arm. The biasing element depends from the release tab and is disposed between the tooth and the distal end. The biasing element engages the bottom part of the hook of the wiper arm such that the release tab is displaced upwardly toward the top part of the hook of the wiper arm when the tooth engages the aperture of the bottom part of the hook of the wiper arm.

In addition, the present invention is directed toward a wiper assembly that includes a wiping element adapted to contact a surface to be wiped, at least one elongated support member acting to support the wiping element, a coupler operatively attached to the support member, and an adapter pivotally attached to the coupler. The adapter releasably attaches the wiper assembly to a wiper arm having a hook including a top part and a bottom part with an aperture disposed in the bottom part. The adapter includes a body, a deck, a resilient release tab, a tooth, and a biasing element. The body has a pair of sides spaced from each other so as to accommodate the hook of the wiper arm therebetween. The deck extends between the sides and engages the top part of the hook of the wiper arm. The resilient release tab is spaced from the deck, is disposed between the sides, and extends to a distal end. The tooth depends from the release tab and engages the aperture of the bottom part of the hook of the wiper arm. The biasing element depends from the release tab and is disposed between the tooth and the distal end. The biasing element engages the bottom part of the hook of the wiper arm such that the release tab is displaced upwardly toward the top part of the hook of the wiper arm when the tooth engages the aperture of the bottom part of the hook of the wiper arm.

In this way, the adapter and wiper assembly of the present invention cooperate to effectively clean a surface to be wiped and, at the same time, provide simple releasable attachment to a wiper arm. Further, the adapter and wiper assembly of the present invention provide advantages related to manufacturing and component assembly.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
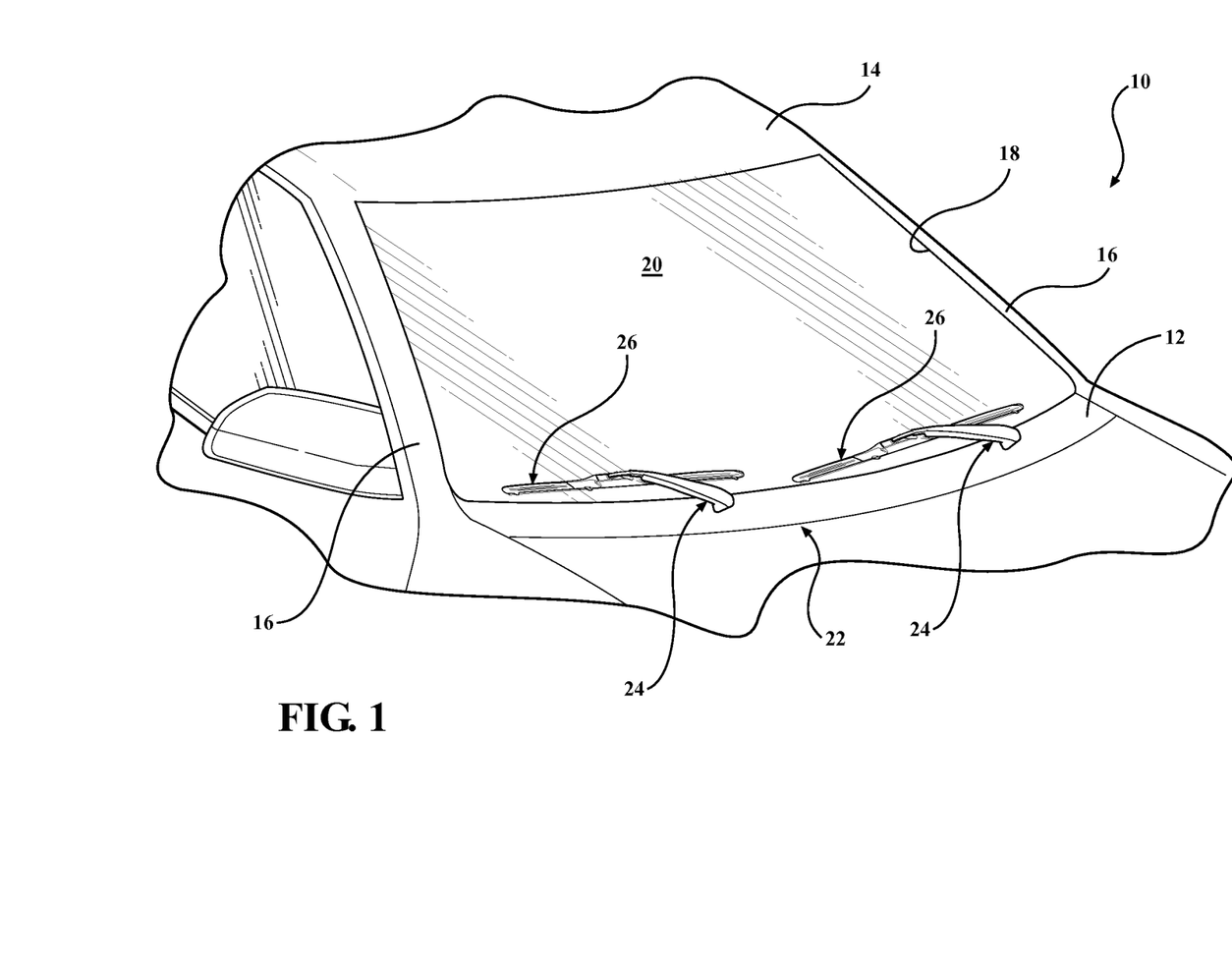
FIG. 1 is a partial perspective view of a front of a vehicle having a pair of wiper assemblies pivotally mounted for reciprocal movement across a windshield of the vehicle.

With reference to the Figures, where like numerals are used to designate like structure throughout the several views, a portion of a vehicle is schematically illustrated at 10 in FIG. 1. The vehicle 10 includes a cowl 12, a roof 14, and a pair of laterally spaced front A-pillars 16 extending between the roof 14 and the cowl 12. The A-pillars 16, roof 14, and cowl 12 cooperate to define a generally rectangular opening 18 in which a curved or "swept back" glass windshield 20 is supported. As illustrated, the vehicle 10 is an automobile, but could be any type of vehicle, such as a heavy-duty truck, train, airplane, ship, construction vehicle or equipment, military vehicle, or any other type of vehicle that contains surface wiper systems.

A wiper system is generally indicated at 22 in FIG. 1 and is employed to clean the windshield 20. The wiper system 22 includes a pair of wiper arms, generally indicated at 24, and a pair of wiper assemblies, generally indicated at 26, which correspond to the driver and passenger sides of the vehicle 10. However, those having ordinary skill in the art will appreciate that the wiper system 22 could employ a single wiper arm 24 and single wiper assembly 26, or more than two wiper arms 24 and more than two wiper assemblies 26, without departing from the scope of the present invention. In the representative example illustrated herein, each wiper assembly 26 is carried by a corresponding wiper arm 24. The wiper system 22 also includes an electric motor (not shown, but generally known in the art) to move the wiper assemblies 26 in an oscillating manner across the surface of the windshield 20.

While the wiper assembly 26 illustrated in FIG. 1 is shown in connection with the front windshield 20 of the vehicle 10, those having ordinary skill in the art will appreciate that wiper assemblies 26 could be used in other areas of the vehicle 10 that employ a wiper system 22, such as a rear window (not shown) or a head lamp (not shown). Thus, it will be understood that the present invention is not limited for use solely in connection with wiper arms 24 adapted for use on a vehicle's windshield 20, but for use in all applications where wiper systems 22 are employed.

Figure 2:
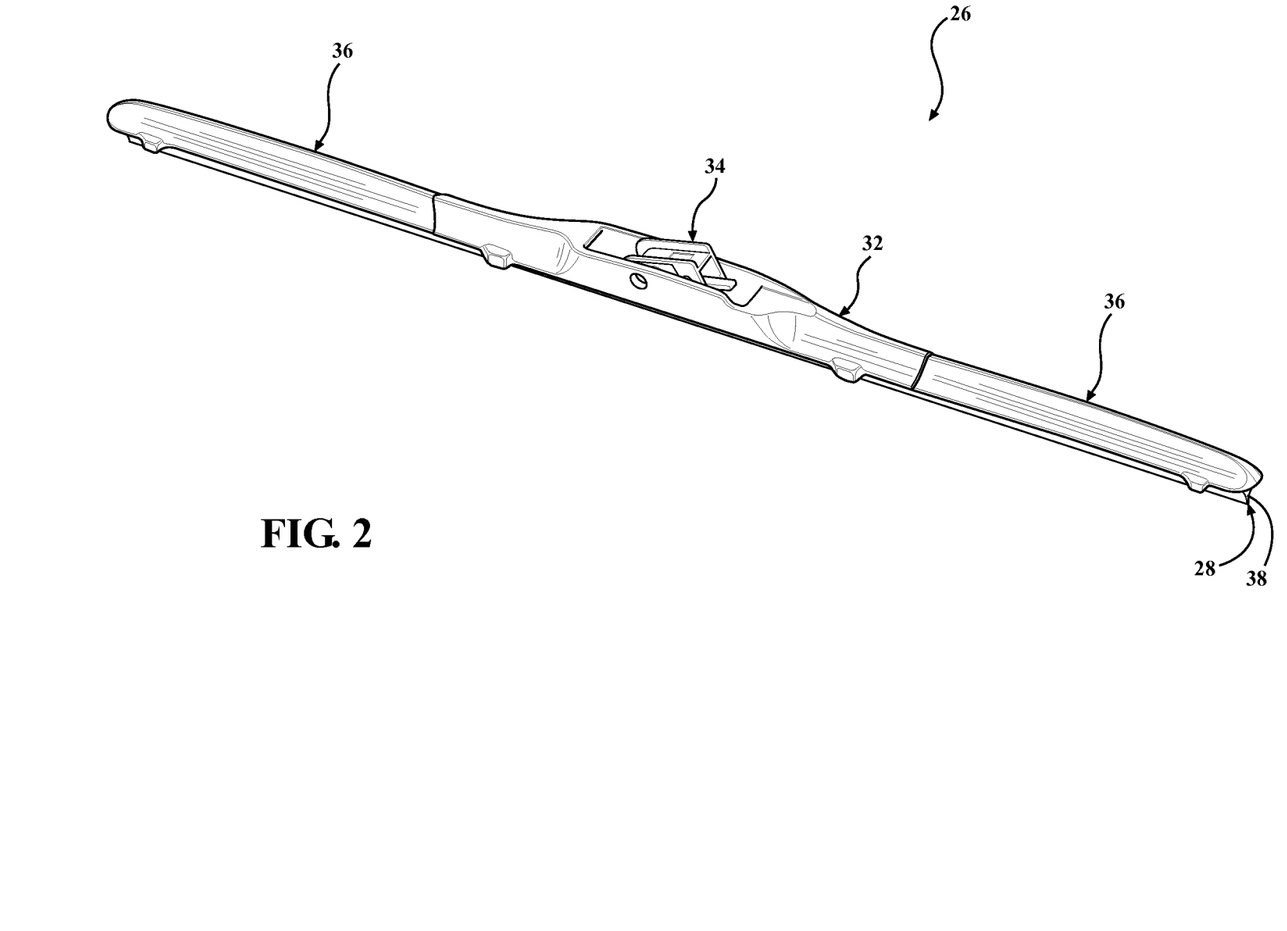
FIG. 2 is an enlarged perspective view of a wiper assembly according to one embodiment of the present invention.
Figure 3:
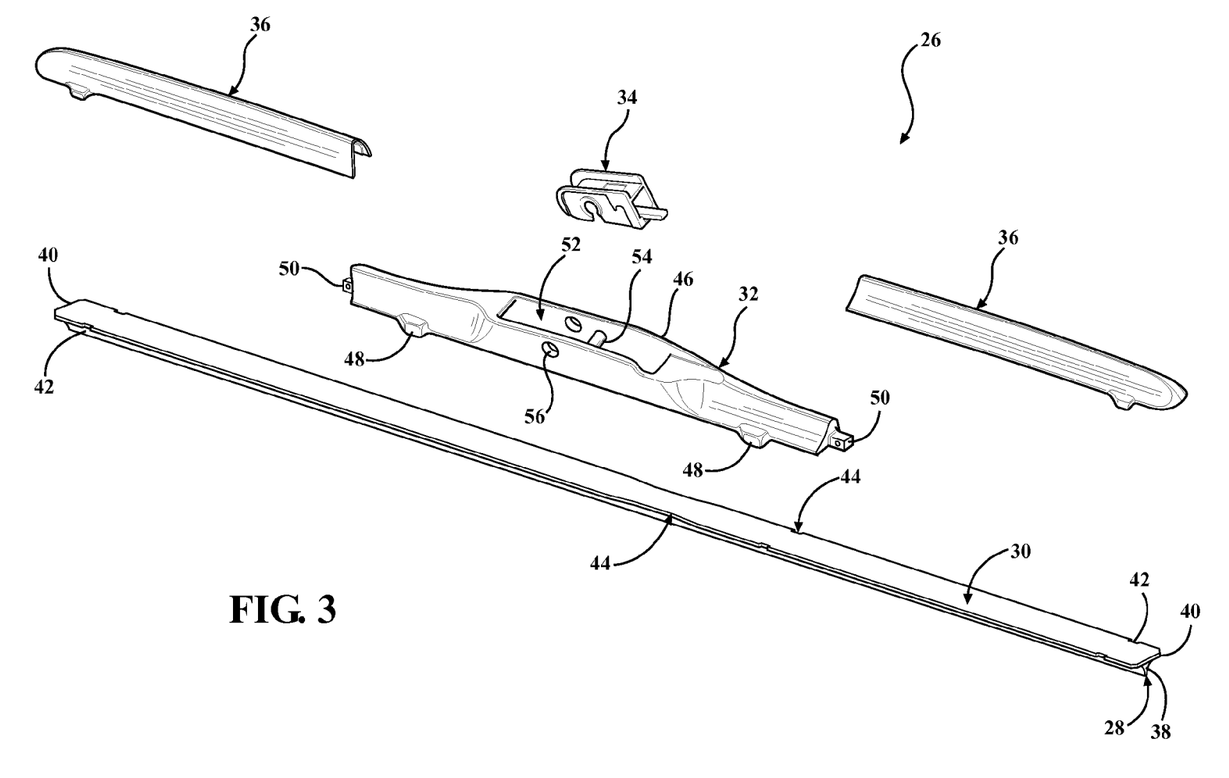
FIG. 3 is an exploded perspective view of the wiper assembly, according to one embodiment of the present invention, of FIG. 2.

Referring to FIGS. 2 and 3, the wiper assembly 26 includes a wiping element 28 that is adapted to contact a surface of the vehicle 10 to be wiped, in this representative example, the windshield 20. The wiper assembly 26 also includes at least one support member 30 that defines a longitudinal axis and that acts to reinforce or support the wiping element 28. In the representative embodiment illustrated herein, the support member 30 is a monolithic beam mounted directly to the wiping element 28, as described in greater detail below. However, those having ordinary skill in the art will appreciate from the description that follows that the support member 30 could be either monolithic or defined by a pair of splines (not shown, but generally known in the art) without departing from the scope of the present invention. The wiper assembly 26 also includes a coupler 32 operatively attached to the support member 30. The coupler 32 is configured to attach to an adapter 34 which, in turn, is adapted to connect to the wiper arm 24. The wiper assembly 26 also includes an airfoil assembly, generally indicated at 36, to prevent the wiper assembly 26 from lifting away from the surface of the windshield 20. Each of the above components will be described in greater detail below.

The wiping element 28 is configured to a predetermined length corresponding to a particular application, and is often manufactured through an extrusion process which enables the length of the wiping element 28 to be easily adjusted without a substantial increase in manufacturing expense. Furthermore, while the wiping element 28 is constructed from a flexible rubber, those having ordinary skill in the art will appreciate that the wiping element 28 could be constructed from any flexible material, such as silicone or another polymer, without departing from the scope of the present invention.

The wiping element 28 typically includes head portion (not shown, but generally known in the art) and a wiping portion 38. The head portion is operatively attached to the monolithic support member 30 with an adhesive, such as glue (not shown, but generally known in the art). However, it will be appreciated that wiping element 28 could be operatively attached to the support member 30 in any suitable way without departing from the scope of the present invention. The wiping portion 38 of the wiping element 28 is adapted to contact the surface to be wiped 20. As shown in FIG. 3, the wiping portion 38 has a generally triangular, tapered profile. However, those having ordinary skill in the art will appreciate that the wiping portion 38 could have any suitable profile, shape, or configuration without departing from the scope of the present invention.

As previously noted, the wiper assembly 26 also includes at least one support member 30 extending between opposed longitudinal ends 42 (see FIG. 3). The support member 30 is constructed from a resiliently flexible material, such as spring steel or a polymer, and is adapted to apply force from an intermediate position between the longitudinal ends 42. More specifically, the support member 30 receives force from the spring loaded wiper arm 24 at an intermediate position and distributes this force across the span of the support member 30 toward the longitudinal ends 42. To that end, the support member 30 may be curved longitudinally with a predetermined radius of curvature. In the related art, this predetermined radius of curvature is sometimes referred to as a "free form" radius of curvature. Accordingly, the curvature of the support member 30 may be symmetrical or asymmetrical, depending on the force requirements of the application and the contour of the windshield 20. The flexible, free form, pre-curved support member 30 straightens out when the wiper arm 24 applies a force thereto and directs the wiping element 28 to contact the windshield 20. Thus, the elongated support member 30 includes a free-form curvature that ensures force distribution on windshields having various curvatures and that effects proper wrapping about the windshield 20.

The support member 30 may have a substantially constant width and a constant thickness throughout its length between the longitudinal ends 40. The constant width and thickness are adapted to provide high lateral and torsional stiffness so as to avoid lateral and torsional deflections, which cause the wiping element 28 to stick/slip ("chatter") on the windshield 20 during operation. Thus, the cross-section of the support member 30 has a generally rectangular outer profile that makes the support member 30 easier to manufacture. More specifically, where the support member 30 is constructed from metal, such as spring steel, the tools and machinery used to manufacture the support member 30 are less complicated than those required to manufacture a support member 30 having varying width and/or thickness. Furthermore, where the support member 30 is constructed from a polymer, such as a thermoplastic elastomer, the manufacturing tools and extrusion process machinery are also less complicated than those employed to manufacture varying width and/or thicknesses. However, those having ordinary skill in the art will appreciate that the support member 30 could have a varying thickness and/or width without departing from the scope of the present invention. Further, as mentioned above, those having ordinary skill in the art will appreciate that the support member 30 could be monolithic or could be formed as a plurality of splines (sometimes referred to in the art as a "twin rail" blade). The support member 30 may also include one or more notches 42 that cooperate with the airfoils 36 to operatively attach the airfoils 36 to the support member 30. As shown, the notches 42 are generally rectangular, but those having ordinary skill in the art will appreciate that the notches could have any suitable shape, or could be omitted entirely, without departing from the scope of the present invention. Additionally, the support member 30 may include one or more securing features, generally indicated at 44, such as additional notches and/or a tapered "hourglass" region (see FIG. 3), for cooperating with the coupler 32 so as to operatively attach the support member 30 to the coupler 32. Those having ordinary skill in the art will appreciate that securing features could be of any suitable shape or configuration, or could be omitted entirely, without departing from the scope of the present invention. Specifically, those having ordinary skill in the art will appreciate that the coupler 32 could be fixed to the support member 30 in several different ways. By way of non-limiting example, the coupler 32 could be glued, welded, crimped, bolted, riveted, formed-over, locked, or otherwise fixed to the support member 30, without departing from the scope of the present invention The wiper assembly 26 also typically includes a coupler 32 operatively attached to the support member 30. As illustrated in FIGS. 2 and 3, the coupler 32 has a base 46 with claws 48 to attach to the support member 30. The base 46 includes mounts 50 that cooperate with the airfoils 36 as described in greater detail below. The base 46 further includes a hollow region 52 with a pin 54 extending therein, and a pair of apertures 56. The hollow region 52, pin 54, and apertures 56 cooperate with one or more adapters 34 to enable releasable attachment to a wiper arm 24 as described in greater detail below. Moreover, the coupler 32 shown in FIGS. 2 and 3 is an integral part of what is referred to in the art as a "hybrid beam blade" wiper assembly 26. However, those having ordinary skill in the art will appreciate that the adapter 34 of the present invention can be used with any suitable type or style of wiper assembly 26 and can cooperate with a coupler 32 of any suitable style, shape, or configuration without departing from the scope of the present invention. Further, in the embodiment illustrated herein, the coupler 32 is a unitary, one piece component. However, those having ordinary skill in the art will appreciate that the coupler 32 could be designed as a plurality of components that interlock or otherwise cooperate to operatively attach to the support member 30, without departing from the scope of the present invention. The coupler 32 is typically constructed from plastic and is formed using an injection molding process. However, those having ordinary skill in the art will appreciate that the coupler 32 could be constructed from any suitable material formed using any suitable process without departing from the scope of the present invention.

The wiper assembly 26 also typically includes at least one airfoil 36 operatively mounted to the support member 30. The airfoil 36 extends along the length of the wiper assembly 26 and acts to reduce the likelihood of wind lift by allowing air to flow over the wiper assembly 26. More specifically, and in the embodiment illustrated herein, the airfoil 36 is formed as two individual components operatively mounted to the support member 30 and to the mounts 50 of the coupler 32, with the coupler 32 extending between the airfoils 36. However, those having ordinary skill in the art will appreciate that the airfoil 36 could be formed as any suitable number of individual components without departing from the scope of the present invention. While the wiper assembly 26 depicted in FIGS. 2 and 3 includes airfoils 36 with tapered bodies and rounded ends, those having ordinary skill in the art will appreciate that the airfoils 36 could be formed differently without departing from the scope of the present invention.

The airfoil 36 is configured to a predetermined length corresponding to a particular application, and may be manufactured by injection molding. However, those having ordinary skill in the art will appreciate that the airfoil 36 could be constructed in other ways, such as by an extrusion process, without departing from the scope of the present invention. Moreover, those having ordinary skill in the art will appreciate that manufacturing by extrusion enables the length of the airfoil 36 to be easily adjusted without a substantial increase in manufacturing expense. Further still, while the airfoil 36 is constructed from plastic, those having ordinary skill in the art will appreciate that the airfoil 36 could be constructed from any suitable material without departing from the scope of the present invention. Moreover, while the airfoil 36 is extruded from a single material, those having ordinary skill in the art will appreciate that the airfoil 36 could be formed from a plurality of materials, such as by co-extrusion, over-molding, skin coating, etc., without departing from the scope of the present invention.

As mentioned above, the adapter 34 of the present invention is configured to be operatively attached to a wiper assembly 26. Moreover, in one embodiment, the adapter 34 is pivotally attached to the coupler 32 of a wiper assembly 26. In general, adapters 34 are employed to releasably attach a wiper assembly 26 to one or more types of wiper arms 24. Those having ordinary skill in the art will appreciate that different OEM's employ wiper arms 24 configured to releasably attach to different adapters 34 which are, in turn, operatively attached to a specific wiper assembly 26. By way of example, certain wiper arms 24 employed by OEM's include "bayonet-style"; "pin-type"; "hook-type"; "push-button"; "pinch-tab"; or "side-pin" connection systems of various sizes. As such, it will be appreciated that wiper arms 24 can be connected to wiper assemblies 26 in a number of different ways, using different sizes and styles of connection systems.

Figure 7:
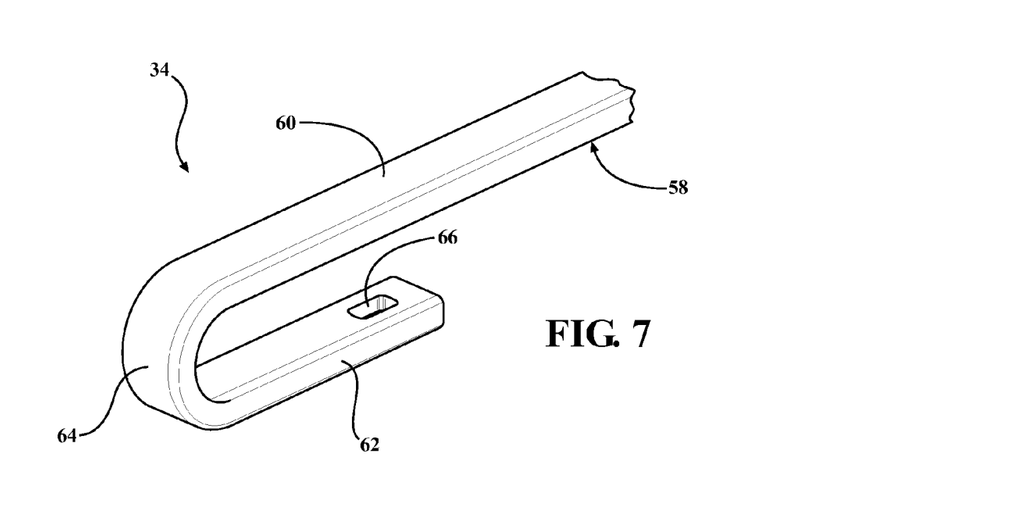
FIG. 7 is an enlarged partial perspective view of a hook-type wiper arm.

Referring now to FIG. 7, the adapter 34 of the present invention used to releasably attach a wiper assembly 26 to a specific type of wiper arm 24 that has a hook 58 which includes a top part 60 and a bottom part 62 with a curved section 64 connecting the top part 60 to the bottom part 62. The bottom part 62 includes an aperture 66 disposed therein. Those having ordinary skill in the art will recognize the wiper arm 24 described above as a "hook-type" wiper arm 24. The wiper arm 24 is typically made from a piece of steel having a substantially rectangular cross-section, and is formed using a bending operation. However, those having ordinary skill in the art will appreciate that "hook-type" wiper arms 24 could be formed in any suitable way, from any suitable material, without departing from the scope of the present invention. Moreover, it should be appreciated that the wiper arm 24 forms no part of the present invention.

Figure 4:
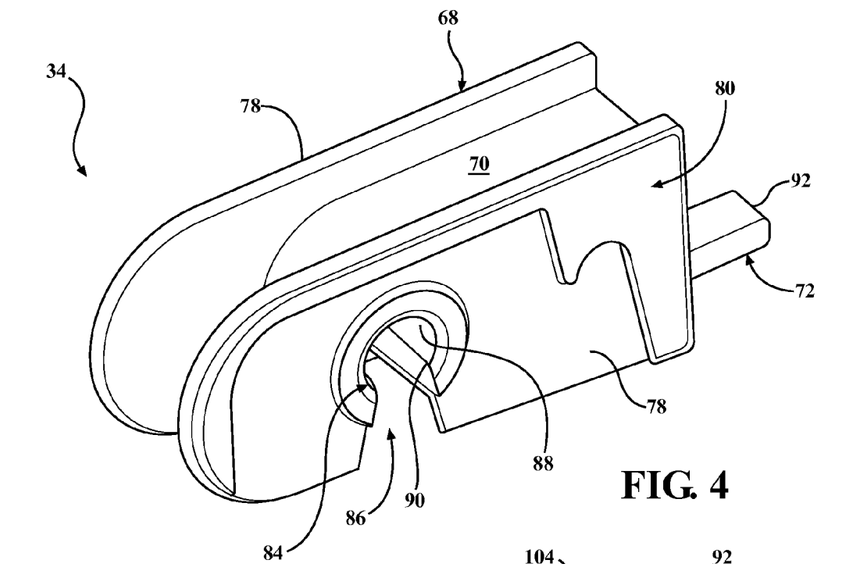
FIG. 4 is an enlarged perspective view of an adapter for the wiper assembly of FIG. 3, according to one embodiment of the present invention.
Figure 5:
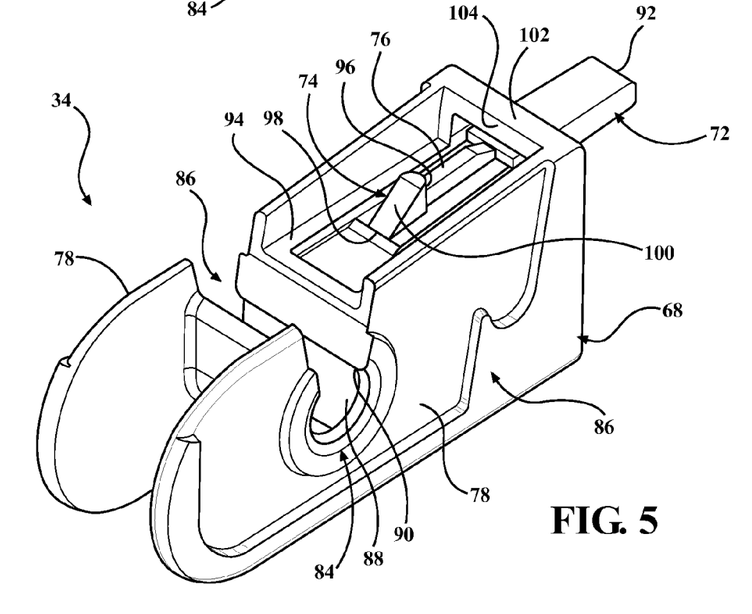
FIG. 5 is an alternate enlarged perspective view of the adapter of FIG. 4.

Referring now to FIGS. 4 and 5, the adapter 34 of the present invention has a body 68, a deck 70, a resilient release tab 72, a tooth 74, and a biasing element 76. Each of these components will be described in greater detail below.

The body 68 of the adapter 34 has a pair of sides 78 spaced from each other so as to accommodate the hook 58 of the wiper arm 24 therebetween. The sides 78 are generally shaped to follow the contours of the hook 58 of the wiper arm 24. However, those having ordinary skill in the art will appreciate that the sides 78 could be shaped in any suitable way without departing from the scope of the present invention. As shown best in FIGS. 4 and 5, the sides 78 of the body 68 of the adapter 34 may also include a contoured plateau 80. The plateau 80 provides rigidity to the body 68 of the adapter 34 and may also serve as a friction pad, whereby the plateau 80 provides a slight interference with the hollow region 52 of the coupler 32 so as to prevent loose rotation of the adapter 34 on the pin 54 of the coupler 32 as described in greater detail below. However, those having ordinary skill in the art will appreciate that the plateaus 80 could be shaped, formed, or configured differently, or could be omitted entirely, without departing from the scope of the present invention.

Figure 8:
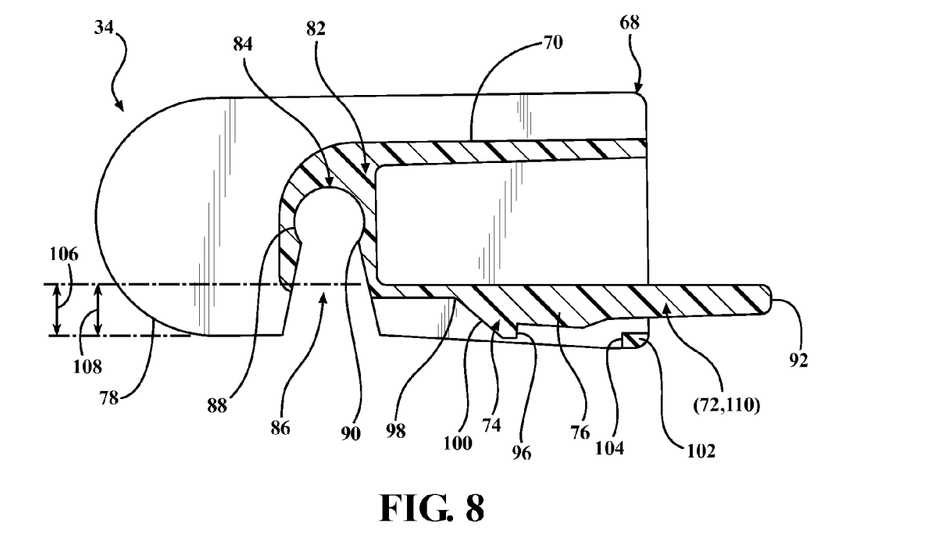
FIG. 8 is a sectional view of the adapter taken along line 8-8 of FIG. 6.
Figure 9:
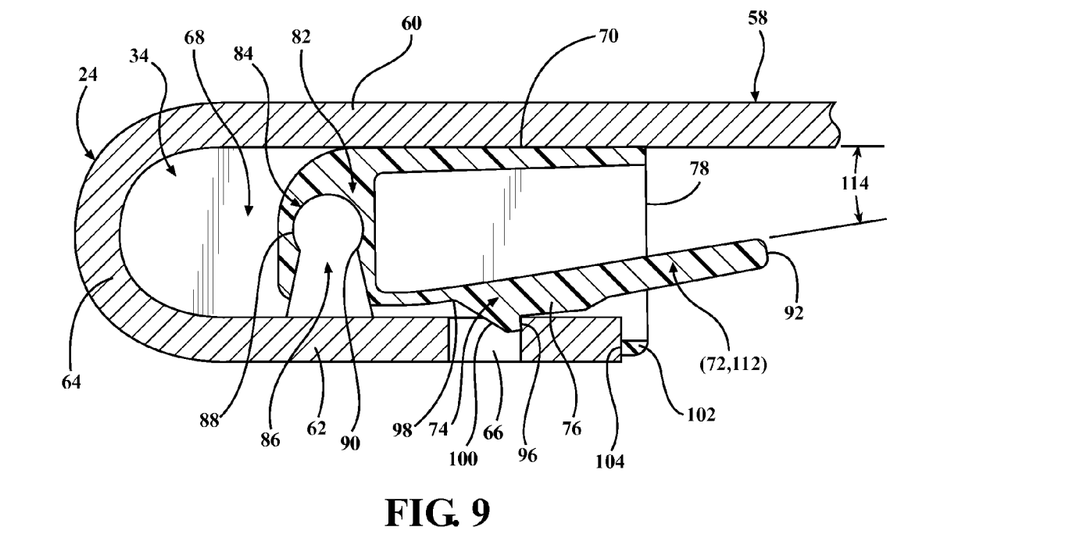
FIG. 9 is a partial sectional view of the adapter and the hook-type wiper arm of FIG. 7 in an assembled configuration.

As shown in FIGS. 4, 8, and 9, the deck 70 of the adapter 34 extends between the sides 78 and is configured to engage the top part 60 of the hook 58 of the wiper arm 24. The deck 70 is a substantially flat surface and, ash shown best by FIG. 9, is configured to be parallel with the top part 60 of the hook 58 of the wiper arm 24. However, those having ordinary skill in the art will appreciate that the deck 70 could be configured in any suitable way sufficient to engage a portion of the top part 60 of the hook 58 of the wiper arm 24 without departing from the scope of the present invention. The deck 70 merges with a shaped inner core 82, as shown best in FIG. 8. Like the deck 70, the inner core 82 also extends between the sides 78 of the body 68 of the adapter 34 and provides further structural rigidity to the adapter 34. However, those having ordinary skill in the art will appreciate that deck 70 could be spaced from the inner core 82, or that the inner core 82 could be omitted entirely, without departing from the scope of the present invention.

In one embodiment, as shown in FIGS. 4, 5, and 8, the adapter 34 includes a pivot 84 spaced from the deck 70 for releasably attaching the adapter 34 to the wiper assembly 26. In the embodiment illustrated throughout the figures, the pivot 84 is defined by a nock 86 disposed in each of the sides 78, the nock 86 including an arcuate rest 88 and at least one locking member 90. Moreover, as illustrated throughout the figures, the pivot 84 extends between the sides 78 and is defined in the inner core 82. However, those having ordinary skill in the art will appreciate that the pivot 84 could be defined in any suitable part of the adapter 34 without departing from the scope of the present invention. As shown best in FIG. 8, the locking members 90 are defined along the ends of the arcuate rest 88. It will be appreciated that the nock 86 helps guide the adapter 34 during connection to the pin 54 of the coupler 32, and that the pivot 84 provides a secure, but releasable connection to the coupler 32. However, those having ordinary skill in the art will appreciate that the nock 86, arcuate rest 88, and locking member 88 could be defined, formed, or configured differently so as to enable a releasable pivoting connection to the coupler 32, without departing from the scope of the present invention. Moreover, the adapter 34 could be pivotally attached to the coupler 32 in any suitable way without departing from the scope of the present invention.

Figure 6:
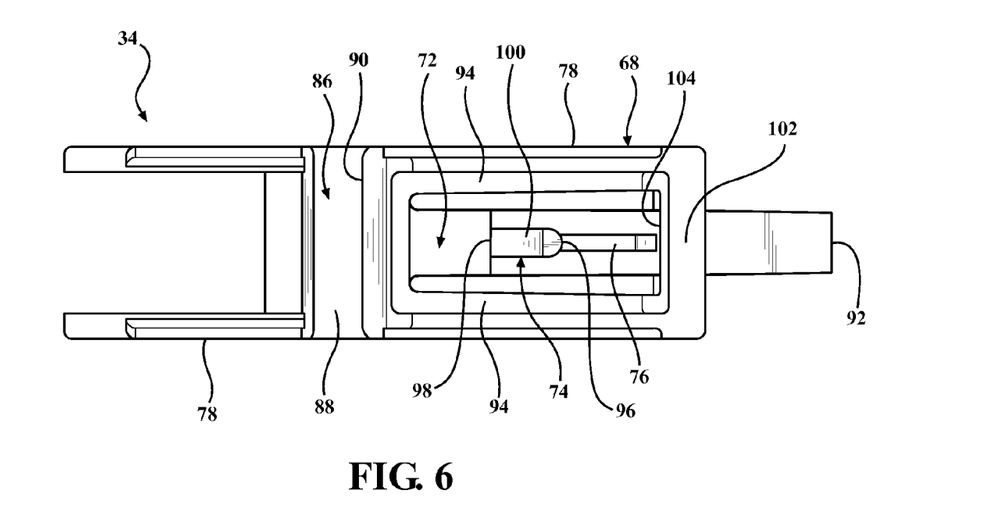
FIG. 6 is an enlarged bottom view of the adapter of FIG. 4.

As mentioned above, the adapter 34 of the present invention also includes a release tab 72. As shown in FIGS. 5 and 6, the release tab 72 is spaced from the deck 70, is disposed between the sides 78, and extends to a distal end 92. As shown in FIGS. 8 and 9, the release tab 72 merges with and extends from the inner core 82. However, those having ordinary skill in the art will appreciate that the release tab 72 could extend from any suitable portion of the adapter 34 spaced from the deck 70 and disposed between the sides 78 without departing from the scope of the present invention.

As shown in FIGS. 5 and 6, in one embodiment, the adapter 34 includes a pair of shelves 94 spaced from the deck 70 and extending from each of the sides 78, with the release tab 72 being disposed at least partially between the shelves 94. The shelves 94 are configured to engage the bottom part 62 of the hook 58 of the wiper arm 24. Moreover, the shelves 94 are spaced from the deck 70 at a distance that is less than the distance between the top part 60 and the bottom part 62 of the hook 58 of the wiper arm 24. The shelves 94 provide additional structural rigidity to the adapter 34. However, those having ordinary skill in the art will appreciate that the shelves 94 could be configured differently, or could be omitted entirely, without departing from the scope of the present invention.

As mentioned above, the adapter 34 of the present invention also includes a tooth 74. The tooth 74 depends from the release tab 72 and is configured to engage the aperture 66 of the bottom part 62 of the hook 58 of the wiper arm 24, such that the tooth 74 prevents the wiper arm 24 and adapter 34 from disconnecting in operation. As shown best in FIG. 8, in one embodiment, the tooth 74 has a shoulder 96 for engaging the aperture 66 of the bottom part 62 of the hook 58 of the wiper arm 24, a base end 98 spaced from the shoulder 96, and a tapered portion 100 connecting the shoulder 96 to the base end 98. It will be appreciated that the tapered portion 100 engages the bottom part 62 of the hook 58 of the wiper arm 24 during attachment, whereby the release tab 72 is displaced upwardly until the shoulder 96 engages the aperture 66 of the bottom part 62 of the hook 58 of the wiper arm 24. However, those having ordinary skill in the art will appreciate that the tooth 74 could be configured differently without departing from the scope of the present invention. Specifically, the tooth 74 could have different structure sufficient to engage the aperture 66 of the bottom part 62 of the hook 58 of the wiper arm 24.

As shown in FIGS. 5, 6, 8, and 9, in one embodiment, the adapter 34 includes a bridge 102 extending between the sides 78 of the body 68. The bridge 102 is spaced from the release tab 72 and defines a stop 104 for engaging the bottom part 62 of the hook 58 of the wiper arm 24 when the tooth 74 engages the aperture 66 of the bottom part 62 of the hook 58 of the wiper arm 24. Moreover, the bridge 102 provides structural rigidity to the adapter 34. However, those having ordinary skill in the art will appreciate that the bridge 102 could be omitted without departing from the scope of the present invention.

As mentioned above, the adapter 34 of the present invention also includes a biasing element 76. As shown best in FIGS. 6 and 8, the biasing element 76 depends from the release tab 72 and is disposed between the tooth 74 and the distal end 92. The biasing element 76 is configured to engage the bottom part 62 of the hook 58 of the wiper arm 24 when the tooth 74 engages the aperture 66 of the bottom part 62 of the hook 58 of the wiper arm 24, such that the release tab 72 is displaced upwardly toward the top part 60 of the hook 58 of the wiper arm 24. Moreover, the upward displacement persists while the tooth 74 remains engaged to the aperture 66 of the bottom part 62 of the hook 58 of the wiper arm 24. As shown best in FIG. 5, the biasing element 76 has an elongated and substantially rectangular shape with a tapered end. However, those having ordinary skill in the art will appreciate that the biasing element 76 could have any shape suitable to effect the upward displacement discussed above.

As shown in FIGS. 5, 6, 8 and 9, in one embodiment, the biasing element 76 merges with the tooth 74. However, those having ordinary skill in the art will appreciate that the biasing element 76 could be spaced from the tooth 74 without departing from the scope of the present invention.

Referring now to FIG. 8, in one embodiment, the tooth 74 defines a first height 106 with the release tab 72 and the biasing element 76 defines a second height 108 with the release tab 72. The first height 106 is greater than the second height 108, whereby the tooth 74 can remain engaged to the aperture 66 of the bottom part 62 of the hook 58 of the wiper arm 24 and, at the same time, the biasing element 76 can effect the upward displacement discussed above.

As shown in FIGS. 8 and 9, in one embodiment, the release tab 72 has a first position 110 where the release tab 72 is substantially parallel to the deck 70 (see FIG. 8), and a second position 112 where the release tab 72 and the deck 70 define an angle 114 therebetween (see FIG. 9). The release tab 72 is movable from the first position 110 to the second position 112 in response to the biasing element 76 engaging the bottom part 62 of the hook 58 of the wiper arm 24. As shown in FIG. 9, the angle 114 is approximately 10 to 20 degrees. However, those having ordinary skill in the art will appreciate that any suitable angle 114 could be defined between the release tab 72 and the deck 70 when the release tab 72 moves to the second position 112 without departing from the scope of the present invention.

In this way, the adapter 34 and wiper assembly 26 of the present invention cooperate to provide simple releasable attachment to a "hook-type" wiper arm 24. Specifically, those having ordinary skill in the art will appreciate that the upward displacement effected by the biasing element 76 moves the distal end 92 of the release tab 72 upward in the hollow region 52 of the coupler 32, thereby significantly improving user access to the release tab 72.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An adapter for use in releasably attaching a wiper assembly to a wiper arm having a hook including a top part and a bottom part with an aperture disposed in the bottom part, said adapter comprising:
a body having a pair of sides spaced from each other so as to accommodate the hook of the wiper arm therebetween;
a deck extending between said sides for engaging the top part of the hook of the wiper arm;
a resilient release tab spaced vertically below said deck, disposed laterally between said sides, and extending longitudinally under said deck from a proximal end supported on said body to a distal end, which is displaceable vertically upwardly relative to said body and is accessible from an exterior of said adapter;
a tooth depending from said release tab vertically downwardly away from said deck for engaging the aperture of the bottom part of the hook of the wiper arm; and
a biasing element depending from said release tab vertically downwardly away from said deck and disposed longitudinally under said deck between said tooth and said distal end for engaging the bottom part of the hook of the wiper arm;
said tooth having a base end, a shoulder spaced longitudinally away from said base end toward said distal end, and a tapered portion extending vertically downwardly from said base end to said shoulder to define a tapered tooth face which faces longitudinally towards said proximal end of said release tab such that said release tab is displaced vertically upwardly toward said deck and the top part of the hook of the wiper arm from an initial, first position to a deflected, second position when said tooth engages the bottom part of the hook of the wiper arm, said tooth having a proximal-side tooth height defined between said base end and said shoulder which defines said second position, and said shoulder defining a shoulder face which faces longitudinally towards said distal end and projects downwardly below said biasing element to define a distal-side tooth height that is less than said proximal-side tooth eight, said tooth being engagable with the aperture of the bottom part of the wiper arm such that said release tab returns vertically downwardly to a deflected third position disposed angularly between said first and second positions wherein said biasing element maintains said release tab in said third position and said distal-side tooth height defines said third position of said release element.

2. The adapter as set forth in claim 1, wherein said biasing element merges with said tooth at said shoulder face.

3. The adapter as set forth in claim 1, wherein said tooth defines a first tab height with said release tab, said biasing element defines a second tab height with said release tab, with said first tab height being greater than said second tab height.

4. The adapter as set forth in claim 1, wherein said release tab has said first position where said release tab is substantially parallel to said deck, and a said third position where said release tab and said deck define an angle therebetween, said release tab being movable from said first position to said third position in response to said biasing element engaging the bottom part of the hook of the wiper arm.

5. The adapter as set forth in claim 4, wherein said angle is approximately 10 to 20 degrees.

6. The adapter as set forth in claim 1, wherein said adapter further includes a pair of shelves spaced from said deck and extending from each of said sides for engaging the bottom part of the hook of the wiper arm, with said release tab being disposed at least partially between said shelves.

7. The adapter as set forth in claim 1, wherein said adapter further includes a pivot spaced from said deck for releasably attaching said adapter to the wiper assembly.

8. The adapter as set forth in claim 7, wherein said pivot is defined by a nock disposed in each of said sides, said nock including an arcuate rest and at least one locking member.

9. The adapter as set forth in claim 1, further including a bridge extending between said sides of said body, said bridge spaced from said release tab, disposed longitudinally away from said shoulder face, and defining a stop for engaging the bottom part of the hook of the wiper arm when said tooth engages the aperture of the bottom part of the hook of the wiper arm.

10. The adapter as set forth in claim 1, wherein said release tab has a first tab thickness defined by said shoulder of said tooth, a second tab thickness defined by said biasing element which is smaller than said first tab thickness, and a third tab thickness defined by said distal end of said release tab which is smaller than said first and second tab thicknesses.

11. A wiper assembly comprising:
a wiping element adapted to contact a surface to be wiped;
at least one elongated support member acting to support said wiping element;
a coupler operatively attached to said support member; and
an adapter pivotally attached to said coupler for use in releasably attaching to a wiper arm having a hook including a top part and a bottom part with an aperture disposed in the bottom part, said adapter including:

a body having a pair of sides spaced from each other so as to accommodate the hook of the wiper arm therebetween, a deck extending between said sides for engaging the top part of the hook of the wiper arm, a resilient release tab spaced vertically below said deck, disposed laterally between said sides, and extending longitudinally from a proximal end supported on said body to a distal end, which is displaceable vertically upwardly relative to said body and is accessible from an exterior of said adapter, a tooth depending vertically downwardly from said release tab away from said deck for engaging the aperture of the bottom part of the hook of the wiper arm, and a biasing element depending from said release tab vertically downwardly away from said deck and disposed longitudinally under said deck between said tooth and said distal end for engaging the bottom part of the hook of the wiper arm;

said tooth having a base end, a shoulder spaced longitudinally away from said base end toward said distal end, and a tapered portion extending vertically downwardly from said base end to said shoulder to define a tapered tooth face which faces longitudinally towards said proximal end of said release tab such that said release tab is displaced vertically upwardly toward said deck and the top part of the hook of the wiper arm from an initial, first position to a deflected, second position when said tooth engages the bottom part of the hook of the wiper arm, said tooth having a proximal-side tooth height defined between said base end and said shoulder which defines said second position, and said shoulder defining a shoulder face which faces longitudinally towards said distal end and projects downwardly below said biasing element to define a distal-side tooth height that is less than said proximal-side tooth height, said release tab being returnable vertically downwardly to a deflected, third position disposed angularly between said first and second positions when said tooth engages with the aperture of the bottom part of the wiper arm wherein said biasing element maintains said release tab in said third position and said distal-side tooth height defines said third position of said release element.

12. The wiper assembly as set forth in claim 11, wherein said biasing element merges with said tooth.

13. The wiper assembly as set forth in claim 11, wherein said tooth defines a first height with said release tab, said biasing element defines a second height with said release tab, with said first height being greater than said second height.

14. The adapter as set forth in claim 11, wherein said release tab has said first position where said release tab is substantially parallel to said deck, said second position where said release tab and said deck define a first angle therebetween, and said third position where said release tab and said deck define a second angle greater than said first angle, said release tab being movable from said first position to said second position in response to said tooth engaging the bottom part of the hook of the wiper arm, and movable from said second position to said third position in response to said tooth engaging said aperture and said biasing element engaging the bottom part of the hook of the wiper arm.

15. The adapter as set forth in claim 14, wherein said second angle is approximately 10 to 20 degrees.

16. The wiper assembly as set forth in claim 11, wherein said adapter further includes a pair of shelves spaced from said deck and extending from each of said sides for engaging the bottom part of the hook of the wiper arm, with said release tab being disposed at least partially between said shelves.

17. The wiper assembly as set forth in claim 11, wherein said adapter further includes a pivot spaced from said deck for releasably attaching said adapter to said coupler.

18. The wiper assembly as set forth in claim 17, wherein said pivot is defined by a nock disposed in each of said sides, said nock including an arcuate rest and at least one locking member.

19. The wiper assembly as set forth in claim 11, wherein said adapter further includes a bridge extending between said sides of said body, said bridge spaced from said release tab and defining a stop for engaging the bottom part of the hook of the wiper arm when said tooth engages the aperture of the bottom part of the hook of the wiper arm.

20. The wiper assembly as set forth in claim 11, wherein said release tab has a first tab thickness defined by said shoulder of said tooth, a second tab thickness defined by said biasing element which is smaller than said first tab thickness, and a third tab thickness defined by said distal end of said release tab which is smaller than said first and second tab thicknesses.

* * * * *